Aug. 8, 1933.  A. H. SCHAEFER  1,921,782
ROTARY INTERNAL COMBUSTION MOTOR
Filed Jan. 14, 1930  4 Sheets-Sheet 1

INVENTOR
Alfred H. Schaefer
BY
Charles B. Mann Jr,
ATTORNEY

Aug. 8, 1933.  A. H. SCHAEFER  1,921,782
ROTARY INTERNAL COMBUSTION MOTOR
Filed Jan. 14, 1930  4 Sheets-Sheet 2

INVENTOR
Alfred H. Schaefer
BY
Charles B. Mann Jr,
ATTORNEY

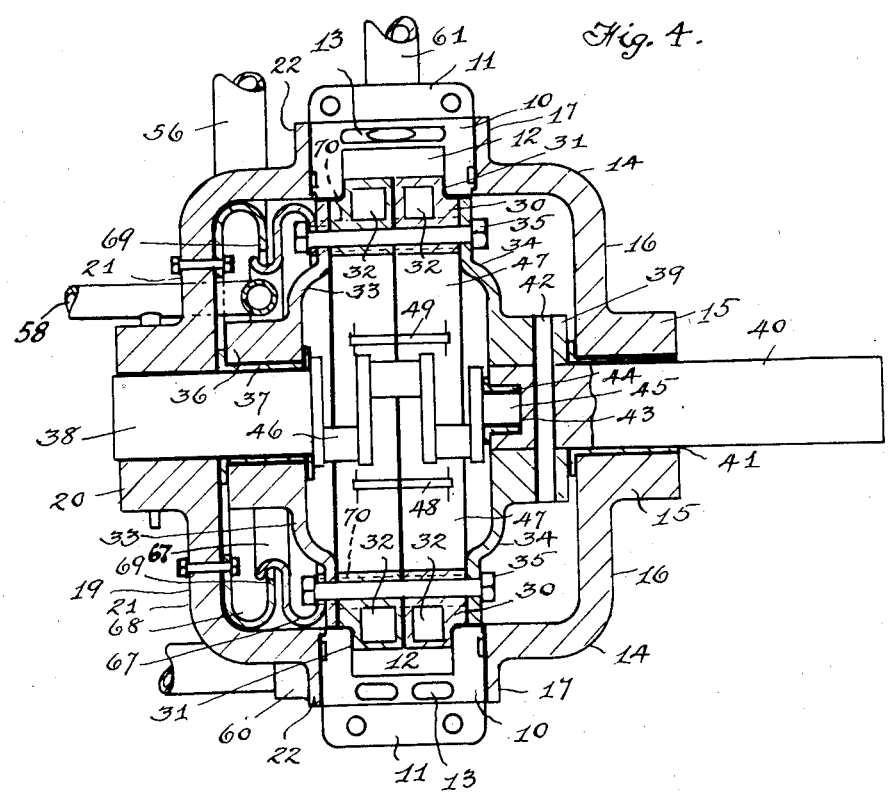

INVENTOR
Alfred H. Schaefer
BY
Charles B. Mann Jr,
ATTORNEY

Patented Aug. 8, 1933

1,921,782

UNITED STATES PATENT OFFICE 1,921,782

ROTARY INTERNAL COMBUSTION MOTOR

Alfred H. Schaefer, Baltimore, Md.

Application January 14, 1930. Serial No. 420,681

2 Claims. (Cl. 123—16)

This invention relates to improvements in rotary internal combustion motors and has among its objects to provide an improved motor which shall be light in weight, economical in operation and which will produce a maximum efficiency of gas combustion.

Another object is to provide an improved construction of motor whereby the number of parts and the wear on the same are reduced to a minimum.

A further object is to provide an improved construction of rotary motor wherein the rotor, as well as the casing in which the rotor revolves, shall be water-cooled.

A still further object is to provide a novel construction of rotary motor wherein the spark plugs and the means that control the intake, compression, expansion and exhaust all move with the rotor and the moving parts are positively actuated in both directions.

Another object is to provide a novel construction and arrangement of intake and expansion slide-means combined with a stationary crank.

With the above and other objects in view, the invention is illustrated in the accompanying drawings, wherein,—

Fig. 4 illustrates the machine in vertical section, the section being taken on the line 4—4 of Fig. 1 and looking in the direction of the darts,— the compression and expansion slides and the connecting-rods for actuating the same being omitted for the sake of clearance.

Figure 1:
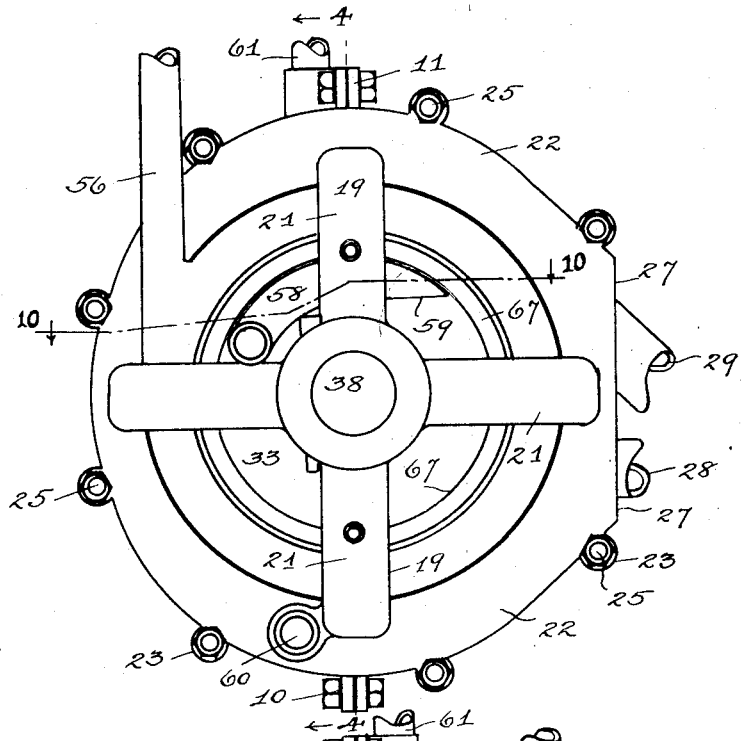
Fig. 1 shows the machine in side elevation as viewed from one side of the same.
Figure 2:
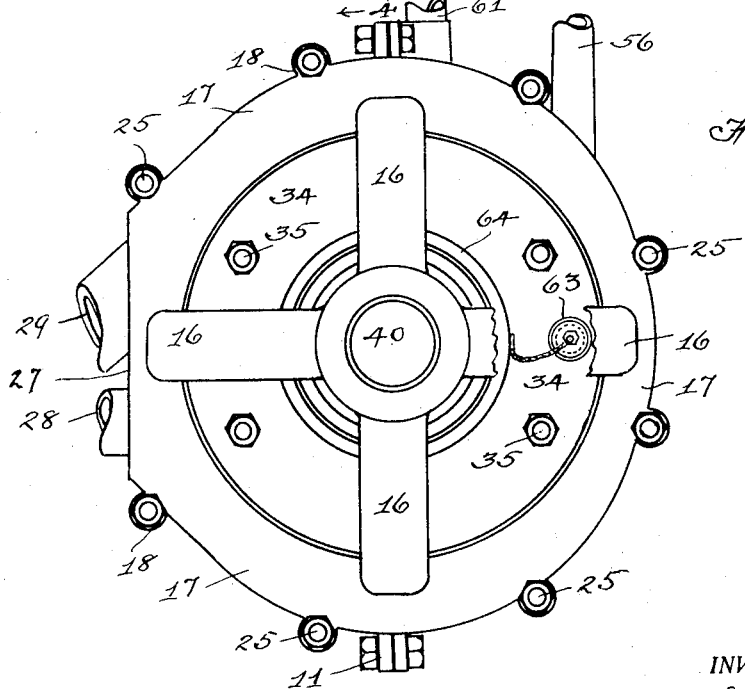
Fig. 2 illustrates another side elevation of the machine as viewed from the opposite side thereof.
Figure 5:
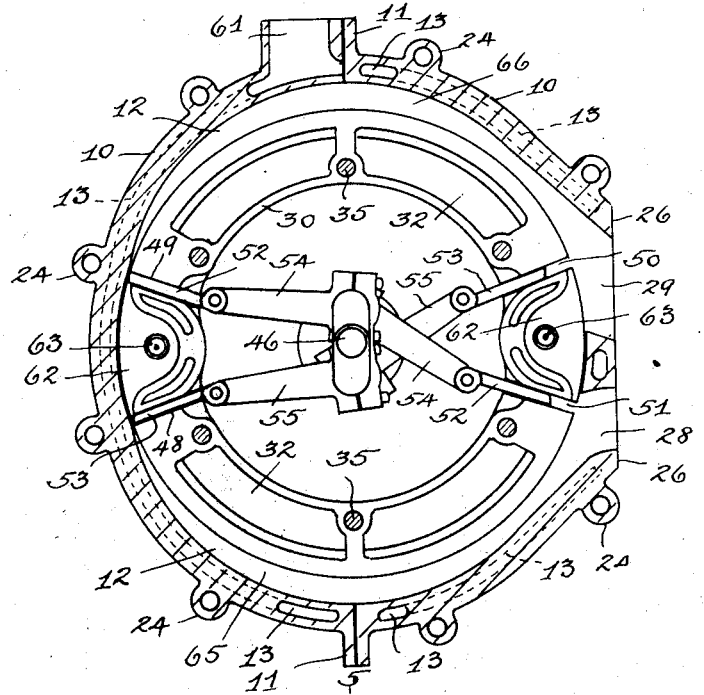
Fig. 5 shows a vertical cross-sectional detail through the casing and shows one half of the rotor with its interior connecting-rods,—the parts being shown as though viewed on the line 5—5 of Fig. 3.

Figs. 6, 7, 8 and 9 illustrate diagrammatically the rotor-chamber and the rotor with its combustion and firing recesses together with the slides and connecting rods for actuating the latter. The views showing respectively the compression, firing, exhausting and intake positions of the rotor and a pair of its slides and Fig. 10 shows a horizontal sectional detail through the motor as viewed on the line 10—10 of Fig. 1 and shows the water supply pipe that supplies water to the bands.

Referring to the drawings the numeral 10, designates a rotor-case, which, in practice is formed of two parts which are bolted together at 11 on a median line at the top and bottom and which form a substantially annular rotor-channel 12 around their inner sides.

Between the rotor-channel 12 at the inner side, and the substantially annular exterior, this rotor-case is preferably provided with internal channels which form a jacket or space 13, for a cooling medium.

At one side of the rotor-case I provide what I term a spark frame 14, which has a central hub 15, with a plurality of radial spokes or arms 16, and a ring-plate 17, is carried by the outer extremities of said arms. The diameter of this ring-plate is substantially the same as the diameter of the rotor-case 10 so that the same will seat against one side of the case. A plurality of eyes or lugs 18 are provided around the outer edge of the ring-plate for a purpose that will presently be explained.

At the opposite side of the rotor-case 10, there is a water-frame 19 and this frame has a central hub 20 with a plurality of radial spokes or arms 21, which latter also carry a ring-plate 22 at their outer ends.

This water-frame ring-plate 22 seats against the opposite side of the rotor-case and also has a series of eyes or lugs 23 around its outer edge.

Figure 3:
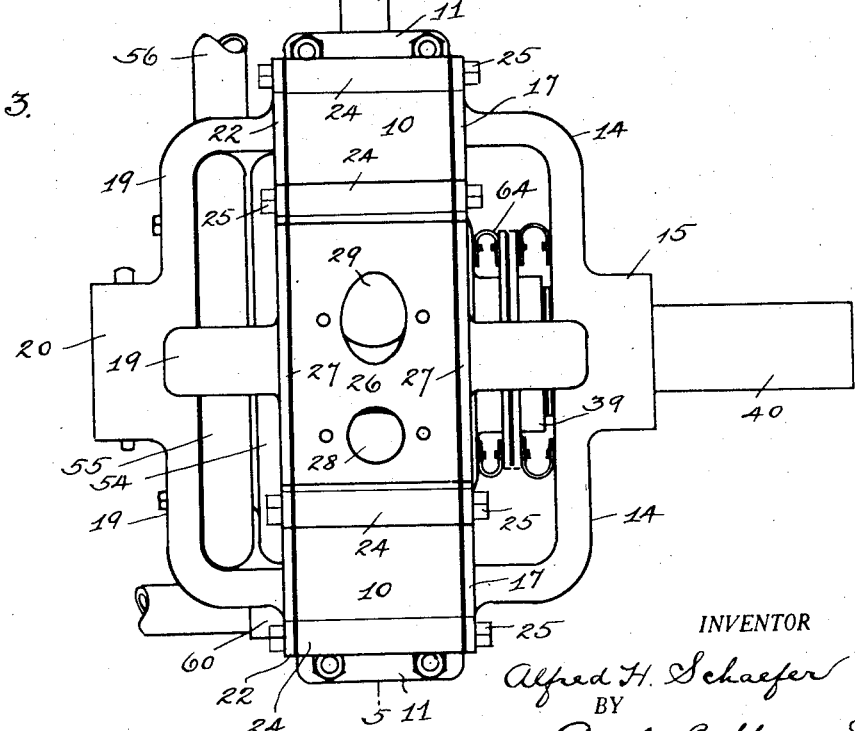
Fig. 3 shows the machine in front elevation and looking toward the intake and exhaust ports thereof, the piping to and from said ports being omitted.

Tubular bolt-lugs 24 are provided around the rotor-case at intervals so that the lugs or eyes 18 and 23 on the frames at opposite sides thereof may be registered therewith, and bolts 25, are passed horizontally through said eyes and lugs to bolt the frames against the opposite sides of the rotor-case, as shown in Fig. 3 of the drawings.

It is deemed advisable to point out that the rotor-case 10, and the two frames 14 and 19 at opposite sides thereof all remain stationary.

By reference to Figs. 1, 2, 3 and 5 it will be noted that at one side, the rotor-case has a flat vertical face 26 and that the ring-plates 17 and 22 at opposite sides of the case are correspondingly-shaped with flat faces or edges 27. This flat-faced side is the place where the intake 28 and exhaust connections 29 are made, as will presently be better understood.

In the present invention the rotor-body is located within the rotor-case 10, in alinement with the rotor-channel 12 and in the present instance this rotor-body has the form of two rings 30 arranged side-by-side and in sealing contact.

These two rotor-body rings are shaped at their circumference (see Fig. 4) so as to snugly enter the channel 12 of the case and to also fit accurately around the inner circumferential edges 31 of said channel.

The rotor-body also has annularly-arranged chambers 32, therein for the circulation of a cooling medium.

A rotor-disk 33, is provided at one side of the rotor-body while a somewhat similar disk 34 is provided at the opposite side thereof.

These disks 33 and 34 and the rotor-body 30, are all bolted together by horizontal bolts 35, and all of them are located within or enclosed by the spark-frame 14 at one side and the water-frame 19 at the opposite side.

The disk 33 has a central hub 36 with an interior bearing-sleeve 37 and a stationary crank-shaft 38, extends through the hub 20 of the water-frame 19 and also through the sleeve 37 to the interior of the rotor.

The disk 34 at the opposite side of the rotor also has a central hub 39 and a drive-shaft 40, extends horizontally through a bearing or bushing sleeve 41 in the hub 15 of the spark-frame and then into the hub 39 of the disk 34 and a pin or key 42 locks the drive-shaft 40 to the disk 34 and rotor.

The inner end of the drive-shaft 40, has a central socket 43 in which a bearing-sleeve 44 is seated and an end 45, of the stationary crank 46 seats in said bearing-sleeve 44, which forms a support for the stationary crank at that side of the rotor.

It is thus to be understood that the rotor-body 30 and its two disks 33 and 34 and the drive-shaft 40, all revolve together, while the crank-shaft 38, and crank 46 remain stationary.

The crank 46, is formed on the end of the crank-shaft 38 and its far end 45, is supported in the end of the revolving drive-shaft.

The rotor-body 30 being annular or ring-shaped, and being closed on the opposite sides by the disks 33 and 34, therefore has a central chamber 47 in which the crank 46 is located and the rotor therefore revolves about the crank.

By reference to Figs. 4, 5 and 6 to 9 inclusive, it will be seen that the rotor-body 30 is provided at substantially diametrically opposite sides with two sets of slideways,—those at one side being designated 48 and 49 while those at the opposite side are denoted 50 and 51.

These slideways extend through the rotor from the interior chamber 47 to the channel 12 of the rotor-case and each slideway contains a slide.

Two of these slides 52, I term expansion-slides while the other two 53, I call compression slides.

The inner ends of the slides 52 are engaged by connecting rods 54 with the crank 46 while the other two slides 53 are engaged by connecting rods 55, with the said crank.

The connection between the crank and the slides 52 are such that as the rotor revolves, the slide 52 at one side of the rotor will be moved outwardly through its slideway in the rotor while the slide 52 at the opposite side of the rotor will be retracted or moved inwardly toward the rotor-chamber.

In the same manner, one slide 53 will be moved outwardly while the other slide will be retracted as the rotor revolves.

The rotor-disk 33 carries an annular water-receiving band 67 at its outer side which latter revolves with the disk and rotor, and this band encircles the hub 36 of the disk 33, and has position within the stationary radial spokes or arms 21 of the water-frame 19.

The spokes or arms 21 of said water-frame 19 carry at their inner sides an annular water discharge-band 68, from which a discharge pipe 56 projects tangentially.

This discharge band has an inwardly-extending annular flange 69 which encircles the annular receiving-band 67 that revolves with the rotor.

A water supply pipe 58 extends through the stationary spokes 19 of the water-frame and has an inner end 59 that projects through the central opening of the water discharge-band 68 and also through the central opening of the annular receiving-band 67 so as to deliver water to said band 67.

The water from the pipe 58, after being deposited in the band 67 passes laterally through passages 70 of the rotor disk 33 into the passage 32 of the rotor, the passages being shown in broken lines in Fig. 4 and also in Fig. 10.

A water inlet pipe 60 is provided at the lower side of the water frame 19 and extends through the ring-plate 22 thereof so that water may be directed into the jacket or space 13 of the rotor-casing, and an outlet pipe 61, extends from the rotor casing whereby to carry the water off after it has circulated through the casing.

By reference to Figs. 5 to 9 inclusive, it will be noted that the rotor-body 30 is provided at diametrically-opposite sides with circumferential concavities 62 and that each of these is located between a pair of radial slides 52 and 53.

Spark plugs 63 extend through the disk 34 and also through the sides of the rotor, and the inner spark-point ends of these plugs are exposed in the said concavities 62.

The outer ends of the spark plugs 63 are exposed at the outer side of the disks 34 so that as the plugs and disk revolve with the rotor, the plugs may successively receive current from ring contact plates 64 supported from the stationary spark-frame 16 and thus produce the desired spark for igniting the explosive mixture that has been admitted to and compressed in the said cavities successively.

The sparking means forms no part of my present invention and therefore is not shown or described in detail.

By reference to Figs. 6 to 9 inclusive, it will be noted that the rotor-body 30 is circular, while the channel 12 in the rotor-casing 10 snugly fits the rotor-body at diametrically opposite sides only, these two sides are at the exhaust 29 and inlet 28 and at the side diametrically opposite said exhaust and inlet.

From the inlet 28 and part of the way around, in the direction of the darts, a compression space 65 is provided in the channel between the rotor and the casing, while at the diametrically opposite side, from the compression space 65, there is an expansion and exhaust space 66 formed between the rotor-body and the casing.

The diagrammatic illustrations of Fig. 6 to 9 inclusive, show the several positions of the rotor 30 in the casing during the operation.

Figure 6:
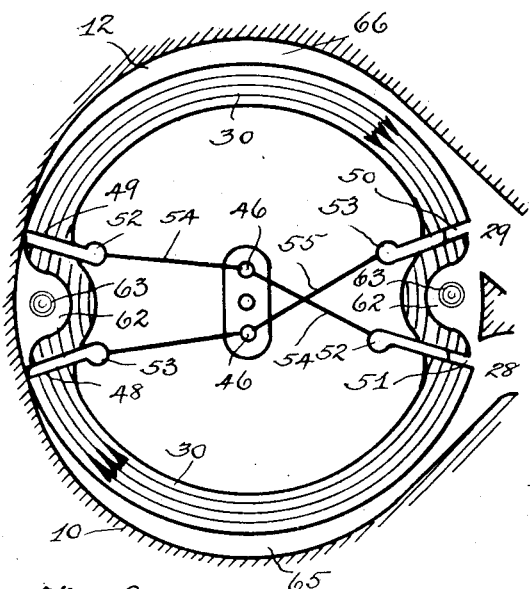

In Fig. 6, one concavity 62 of the rotor is shown at a point between the exhaust 29 and the intake 28, while the opposite concavity of the rotor is in a position where it is sealed and the charge therein has been compressed and ready for firing. At this moment, both the compression and expansion slides cut off all communication between the concavity and the casing channel forward or rearwardly thereof so that when the explosion takes place, the rotor will be given a forward impulse.

Figure 7:
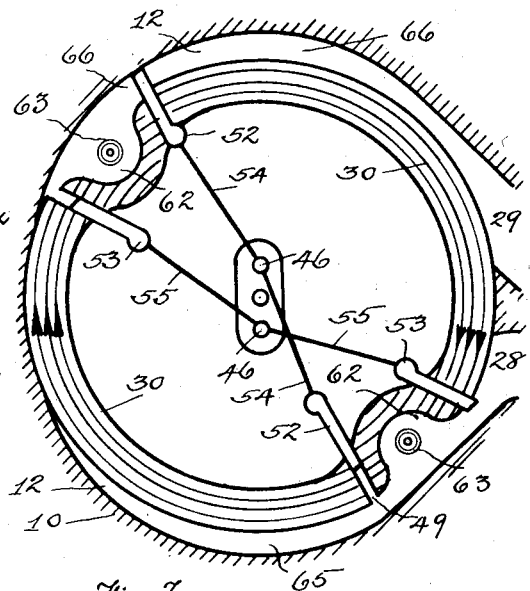

Fig. 7 shows the rotor slightly advanced after the charge has been fired, and in this view the expansion slide 52 is shown projected so the expanding gases can act on the rear side of it, to drive the rotor forward, while the forward side of said slide 52 is acting to push out and scavange the channel ahead of it through the exhaust 29.

As this expansion operation is taking place at one side of the rotor and casing-channel, a fresh mixture charge is entering through the inlet 28 at the opposite side, for it will be seen that at said latter side the intake 28 is wide open to the compression space 65, and the compression slide 53 at that side is just beginning to move outwardly behind the fresh intake charge.

Figure 8:
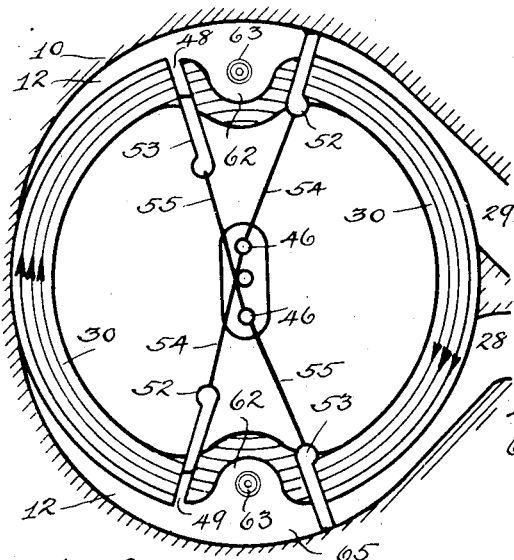

Now by referring to Fig. 8, it will be noted that the rotor has reached a point where the lower compression slide 53 has been projected to cut off the incoming gas behind it and to trap the charge in front of it in the channel, so that further movement of the rotor will result in that trapped charge being compressed as the volume of the channel is reduced in size.

Figure 9:
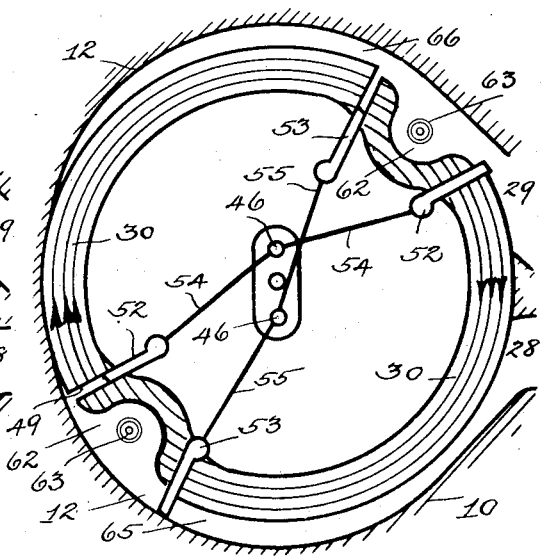

The trapped charge in the channel 65 is therefore compressed as the rotor advances as shown in Fig. 9 until the only space left for that charge is the concavity 62 in the rotor itself, when it will have again reached the position shown in Fig. 6 and made ready for another explosion.

By means of my construction, the volumetric efficiency of the machine is increased because the charge after entering the machine is passed over comparatively cool walls and from then on to the firing position, the temperature is raised.

The compression slide creates a suction behind it to draw in the charge while at the forward side of the said slide the gases are compressed, and because of the concavity in the rotor are kept in turbulent or whirling state over the points of the spark plug until they are fired.

Having described my invention, I claim,—

1. In a rotary internal combustion motor the combination with a stationary rotor-case having a rotor-channel around its inner circumference and provided with a flat face at one side with intake and exhaust ports, of a stationary frame at each side of the rotor-case; a rotor-body encircled by the case and its rotor-channel said body being provided with circumferential cavities at diametrically-opposite sides; a stationary crank-shaft in the rotor-body; a movable expansion-slide at the advance side of each rotor-cavity; a movable compression-slide at the trailing side of each of said rotor-cavities; means operated by the stationary crank-shaft to move the expansion-slide at one cavity outwardly while retracting the expansion-slide at the opposite cavity; means also operated by the crank-shaft for moving the compression-slide at the trailing side of the first-named cavity in one direction while moving the compression-slide at the trailing side of the opposite cavity in a reverse direction and a spark plug exposed in each cavity between a compression and an expansion-slide.

2. In a rotary internal combustion motor the combination with a stationary rotor-case having a rotor-channel around its inner circumference and provided with a flat face at one side with intake and exhaust ports, of a stationary frame at each side of the rotor-case and each frame having a central stationary hub; a rotor-body encircled by the case and its rotor-channel said body being provided with circumferential cavities at diametrically-opposite sides; a rotor-disk secured to each side of the rotor-body and each disk also having a central hub; a stationary crank-shaft having one end passing freely through the hub of one of said disks and secured in the center hub of the frame at one side of the rotor-case; a drive-shaft extending freely through the center hub of the frame at the opposite side of the rotor-case and secured in the center hub of the other rotor-disk; a movable expansion-slide at the advance side of each rotor-cavity; a compression-slide at the trailing-side of each of said rotor cavities; means extending across the interior of the rotor-body from the expansion-slide at the advance side of one cavity to the expansion-slide at the advance side of the diametrically-opposite cavity to simultaneously move them in opposite directions; means for simultaneously actuating the compression-slides at the trailing sides of said cavities from the stationary crank-shaft and spark plugs carried by one of the side rotor-disks and exposed in the rotor-cavities between an expansion and a compression-slide.

ALFRED H. SCHAEFER.